United States Patent
Arai

(10) Patent No.: US 6,710,858 B2
(45) Date of Patent: Mar. 23, 2004

(54) PHOTO FILM CARRIER

(75) Inventor: Haruhiko Arai, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 11 days.

(21) Appl. No.: 10/100,899

(22) Filed: Mar. 20, 2002

(65) Prior Publication Data

US 2002/0140922 A1 Oct. 3, 2002

(30) Foreign Application Priority Data

Mar. 30, 2001 (JP) ........................................ 2001-100415

(51) Int. Cl.⁷ ........................... G03B 27/62; G03B 27/52
(52) U.S. Cl. .......................................... 355/75; 355/41
(58) Field of Search ............................. 355/40, 41, 75, 355/76

(56) References Cited

U.S. PATENT DOCUMENTS

| | | | |
|---|---|---|---|
| 4,933,716 A | * | 6/1990 | Imamura et al. ............. 355/75 |
| 5,592,258 A | * | 1/1997 | Hashizume et al. .......... 355/41 |
| 5,604,565 A | * | 2/1997 | Takahashi ..................... 355/40 |

FOREIGN PATENT DOCUMENTS

| | | | |
|---|---|---|---|
| JP | 404347838 A | * | 12/1992 |
| JP | 6-289507 | | 10/1994 |

* cited by examiner

Primary Examiner—Henry Hung Nguyen
(74) Attorney, Agent, or Firm—Sughrue Mion, PLLC

(57) ABSTRACT

A photo film carrier for access to an image frame in photo film for image reading is provided. Two feeding paths are formed in a carrier body, have respectively a lower guide member and an upper guide member, for passing the photo film. Two mask units include respectively a lower mask and an upper mask disposed in respectively the lower and upper guide members in the carrier body, for insertion of the photo film therebetween. The mask units are adapted for setting the image frame. A mask setting plate is pivotally movable in the carrier body between first and second positions, sets the upper mask close to the lower mask when in the first position, and sets the upper mask up away from the lower mask when in the second position. A support pivot in the carrier body keeps the mask setting plate movable pivotally about a rotational axis that extends crosswise to the feeding paths.

15 Claims, 6 Drawing Sheets

PHOTO FILM CARRIER

BACKGROUND OF THE INVENTION

1. Field of the Invention

The present invention relates to a photo film carrier. More particularly, the present invention relates to a photo film carrier adapted for use with photo films of different types, and having a simplified structure.

2. Description Related to the Prior Art

There is a technique of reading an image from photo film by use of a CCD, digitally processing the image, and then printing the image to photographic paper or other recording sheets. There is a light path through which light from a light source is applied to the photo film in a feeding path. The light transmitted through the photo film is photographed by the CCD to read the image. To read such an image, a photo film carrier is used. A removable mask unit is included in the photo film carrier for positioning an image frame set in a printing position, and has an upper mask and a lower mask. When a different frame size is designated, the size of the upper mask and the lower mask is changed over suitably.

A known type of the photo film carrier is suggested in JP-A 6-289507 or JP-B 2988653 (corresponding to U.S. Pat. No. 5,592,258) in which a carrier body has two parts and is openable up or down from the feeding path, for the purpose of exchanging the upper mask or the lower mask, and raising suitability for adjustment of parts, cleaning, and maintenance in any manner. It is possible at the time of maintenance that the carrier body is fully opened to uncover the feeding path, so the relevant parts can be exchanged or cleaned.

According to JP-A 6-289507, the photo film carrier has a mask set plate for supporting the upper mask. The mask set plate is disposed above the feeding path, and kept movable by use of a hinge or pivot. A solenoid is controlled to actuate the mask set plate, to retain the image frame tightly with the upper mask at the lower mask.

There have been various types of photo films including 135 type and IX240 type. For printing from those types with efficiency, it is necessary for a single type of the photo film carrier to treat those types of photo films. A plurality of photo film feeding paths are required in the photo film carrier for the plural types of photo films.

However, the photo film carrier of the JP-A 6-289507 has problems. The pivot of the mask set plate is parallel with the feeding path. If the upper masks for two of the feeding paths are secured to the mask set plate, the pivot is located close to only a first one of the feeding paths, and farther from a second one of the feeding paths. A second one of the upper masks combined with the second one of the feeding paths must have a longer radius of rotation. It is technically difficult to keep high the precision in positioning the upper masks for the photo film. Furthermore, there occurs a difference in the force of pressing of the upper masks to the photo film between a position near the pivot and a position far from the same. Force of the solenoid to drive the mask set plate is extremely difficult to adjust.

It is certainly possible to use plural combinations of the mask set plate and the solenoid for the plural feeding paths. However, this is not preferable, because a rise in the number of the parts results in a high cost, and is inconsistent in cost reduction. Furthermore, sufficient spaces are required for respectively the plural solenoids. The size of the photo film carrier cannot be compact.

SUMMARY OF THE INVENTION

In view of the foregoing problems, an object of the present invention is to provide a photo film carrier adapted for use with photo films of different types, and having a simplified structure.

In order to achieve the above and other objects and advantages of this invention, a photo film carrier for access to an image frame in photo film for printing or reading is provided. The photo film carrier includes a carrier body. At least one feeding path is formed in the carrier body, has a lower guide member and an upper guide member, for passing the photo film. At least one mask unit includes a lower mask and an upper mask disposed in respectively the lower and upper guide members in the carrier body, for insertion of the photo film therebetween, the mask unit being adapted for setting the image frame. A mask setting member is pivotally movable in the carrier body between first and second positions, for setting the upper mask close to the lower mask when in the first position, and for setting the upper mask up away from the lower mask when in the second position. A support mechanism in the carrier body keeps the mask setting member movable pivotally about a rotational axis that extends crosswise to the feeding path.

Each of the lower and upper masks comprises a transparent mask plate or a mask plate having an opening, for constituting a light path to pass light.

The carrier body includes a base member including the upper guide member, and having the lower mask secured thereto. A cover includes the lower guide member, has the mask setting member secured thereto in a pivotally movable manner, for constituting the support mechanism, to cover the base member.

Furthermore, a loader unit is disposed at a first end of the feeding path, for being loaded with the photo film. A winder unit is disposed at a second end of the feeding path, for winding the photo film from the loader unit. The rotational axis of the support mechanism is disposed close to the winder unit, and when the mask setting member is in the second position, an edge thereof close to the loader unit is disposed higher than when the mask setting member is in the first position.

At least one feeding path comprises plural feeding paths, the at least one mask unit comprises plural mask units, and the mask setting member is single, extends crosswise to the plural feeding paths, and supports the upper mask of any of the plural mask units.

Furthermore, a shifter shifts the mask setting member between the first and second positions.

Furthermore, a hinge mechanism keeps the cover pivotally movable on the base member about a rotational axis that extends substantially in parallel with the feeding path.

The cover includes a cover body. First and second intermediate plates are oriented substantially in parallel with the cover body, disposed under the cover body in a stationary manner, for constituting the upper guide member, and for defining a passage gap therebetween, the passage gap containing the upper mask movably. The mask setting member is contained in a pivotally movable manner in a space defined between the cover body and the first and second intermediate plates.

The shifter includes a solenoid disposed between the plural feeding paths.

The shifter further includes a bias mechanism for biasing the mask setting member toward the second position. The solenoid shifts the mask setting member toward the first position.

The upper mask further includes plural pins for keeping plural corner portions of the mask plate slidable relative to the mask setting member. At least one compression spring biases the mask plate in a direction away from the mask setting member, to press the mask plate toward the lower mask by being compressed when the mask setting member is in the first position, so as to tighten a contact between the mask plate and the photo film.

The plural mask units include first and second mask units, the lower mask of the first mask unit is removably secured to the base member, and the lower mask of the second mask unit is fixedly secured to the base member.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
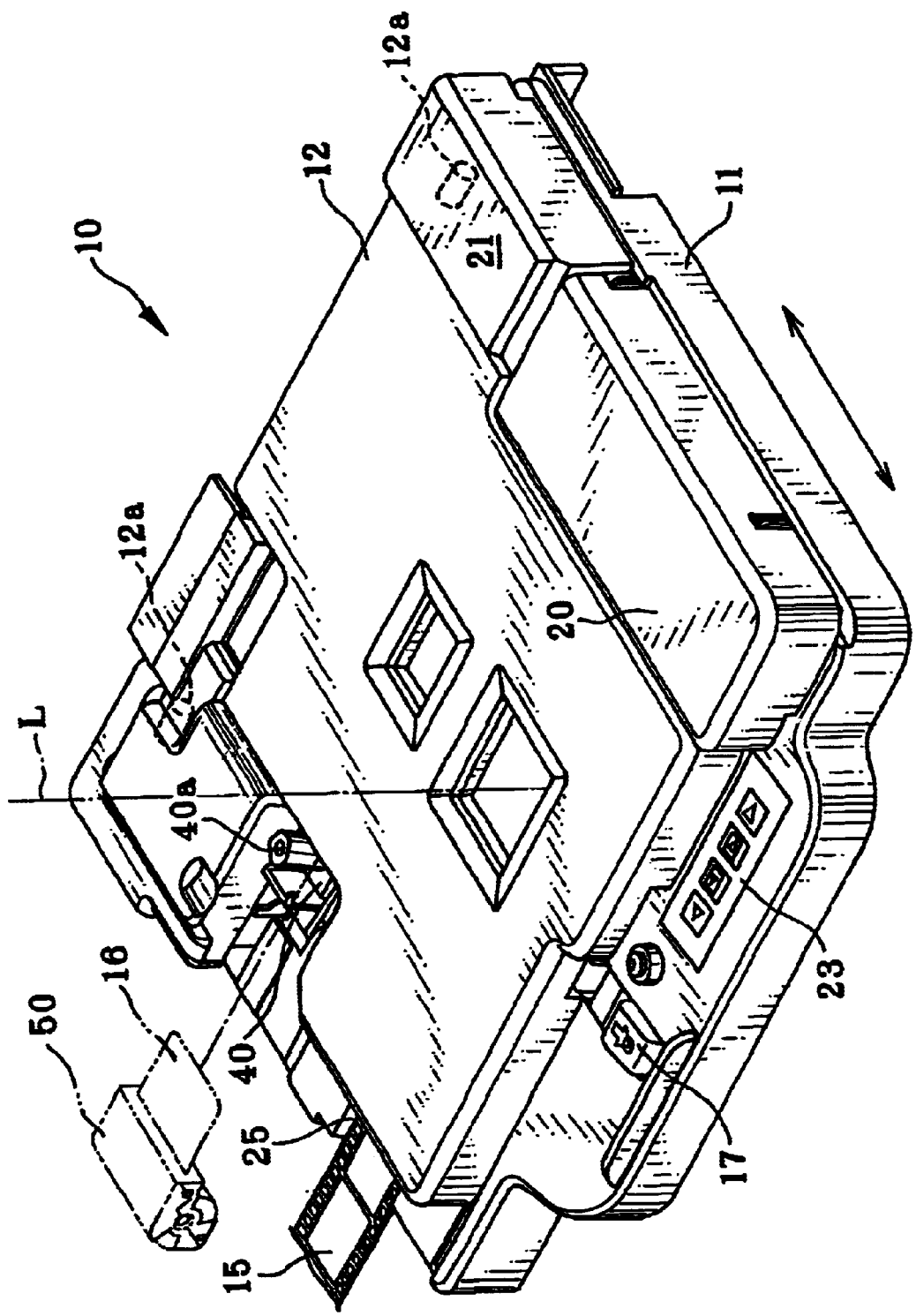
FIG. 1 is a perspective illustrating a photo film carrier of the invention.
Figure 2:
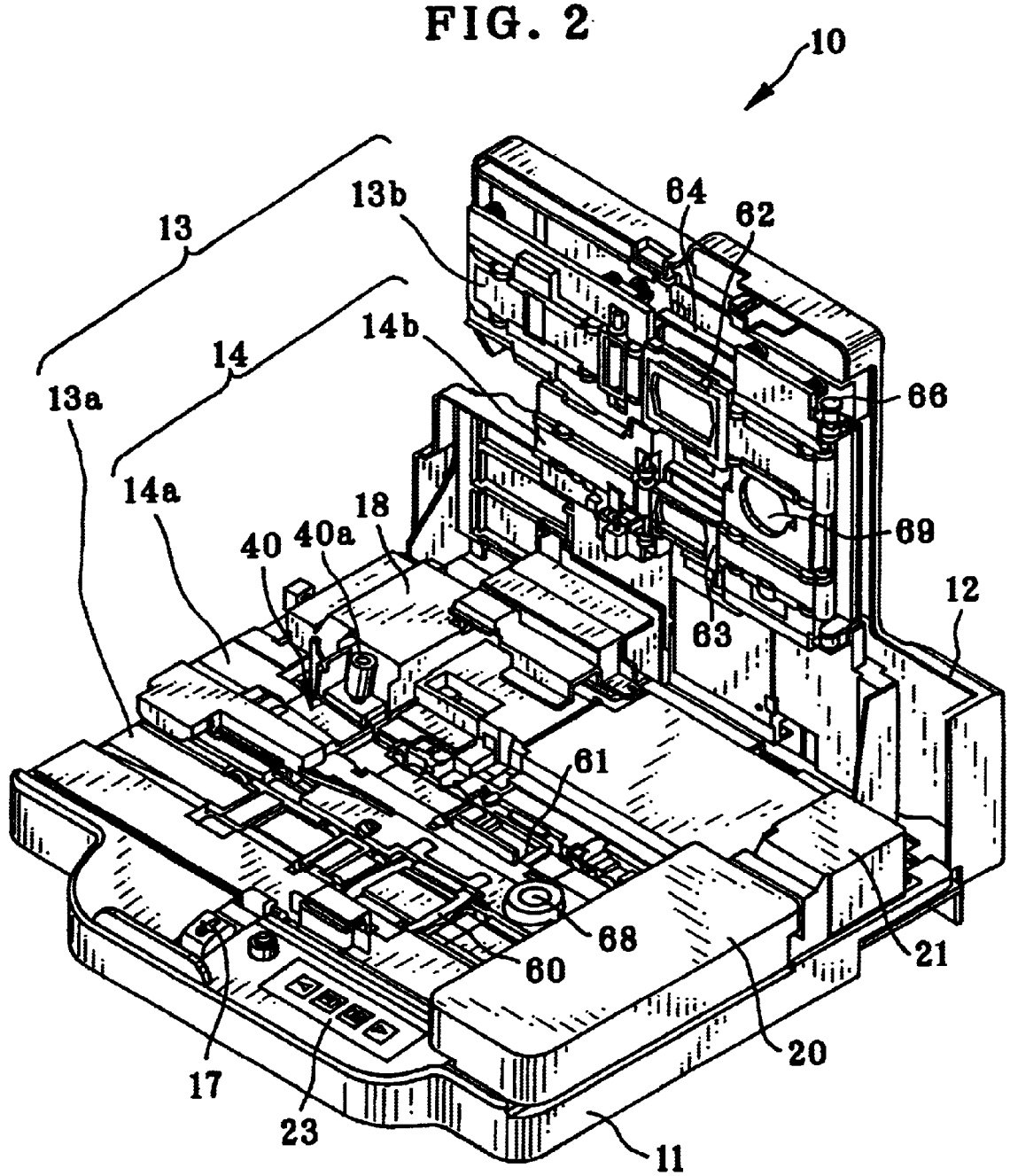
FIG. 2 is a perspective illustrating the photo film carrier in an open state.

In FIG. 1, a photo film carrier 10 while being used is illustrated. In FIG. 2, the photo film carrier 10 in the course of maintenance is illustrated. The photo film carrier 10 has a carrier body constituted by a base plate 11 and a cover or lid 12, between which feeding paths 13 and 14 are defined. Photo film 15 of 135 type is set and fed in the feeding path 13. In parallel with this, photo film 16 of IX240 type is set and fed in the feeding path 14. A carrier sliding mechanism (not shown) secures the photo film carrier 10 to a panel of an image reading device, to cause setting a selected one of the feeding paths 13 and 14 in a position of reading of the image reading device.

Figure 6:
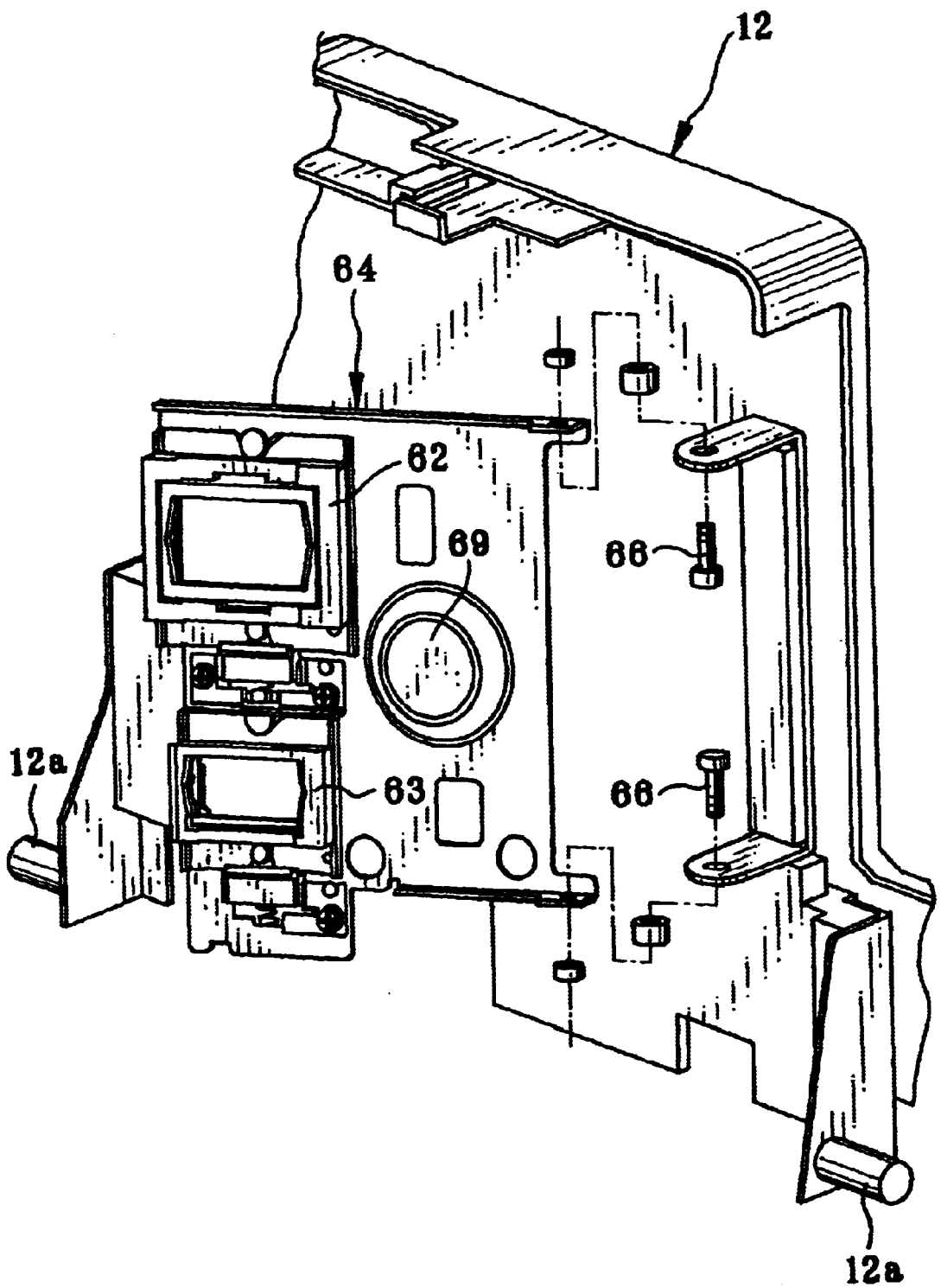
FIG. 6 is a perspective, partially broken, illustrating a cover of the photo film carrier with the mask units and the mask setting plate.

In FIG. 6, a hinge mechanism or pivot 12a keeps the cover 12 movable pivotally on the base plate 11 about an axis parallel to the feeding paths 13 and 14. A spring (not shown) biases the cover 12 toward an open position, the cover 12 being movable toward a closed position. In FIG. 1, a lock mechanism 17 keeps the cover 12 in the closed position when in the used state. The lock mechanism 17 is slid to release the cover 12 from being retained. In response to this, the cover 12 is swung up by the spring, to open the feeding paths 13 and 14 fully. In FIG. 2, the feeding path 13 is defined by a path lower wall 13a at the base plate 11 and a path upper wall 13b at the cover 12. The feeding path 14 is defined by a path lower wall 14a at the base plate 11 and a path upper wall 14b at the cover 12. When the cover 12 is open, the feeding paths 13 and 14 can be inspected, cleaned or administrated in other manners of maintenance.

A driver housing 18 is formed with one lateral side of the base plate 11, and contains an advancing motor 19, planetary gear mechanism, and the like. A photo film winder unit or reservoir 20 and a driver housing 21 are disposed on a side opposite to the driver housing 18. The photo film winder unit 20 has a space for reserving the photo films 15 and 16 set for reading in a temporary manner. A photo film advancing motor 22 is disposed in the driver housing 21. There are operation buttons 23 operable for feeding of the photo film.

Figure 3:
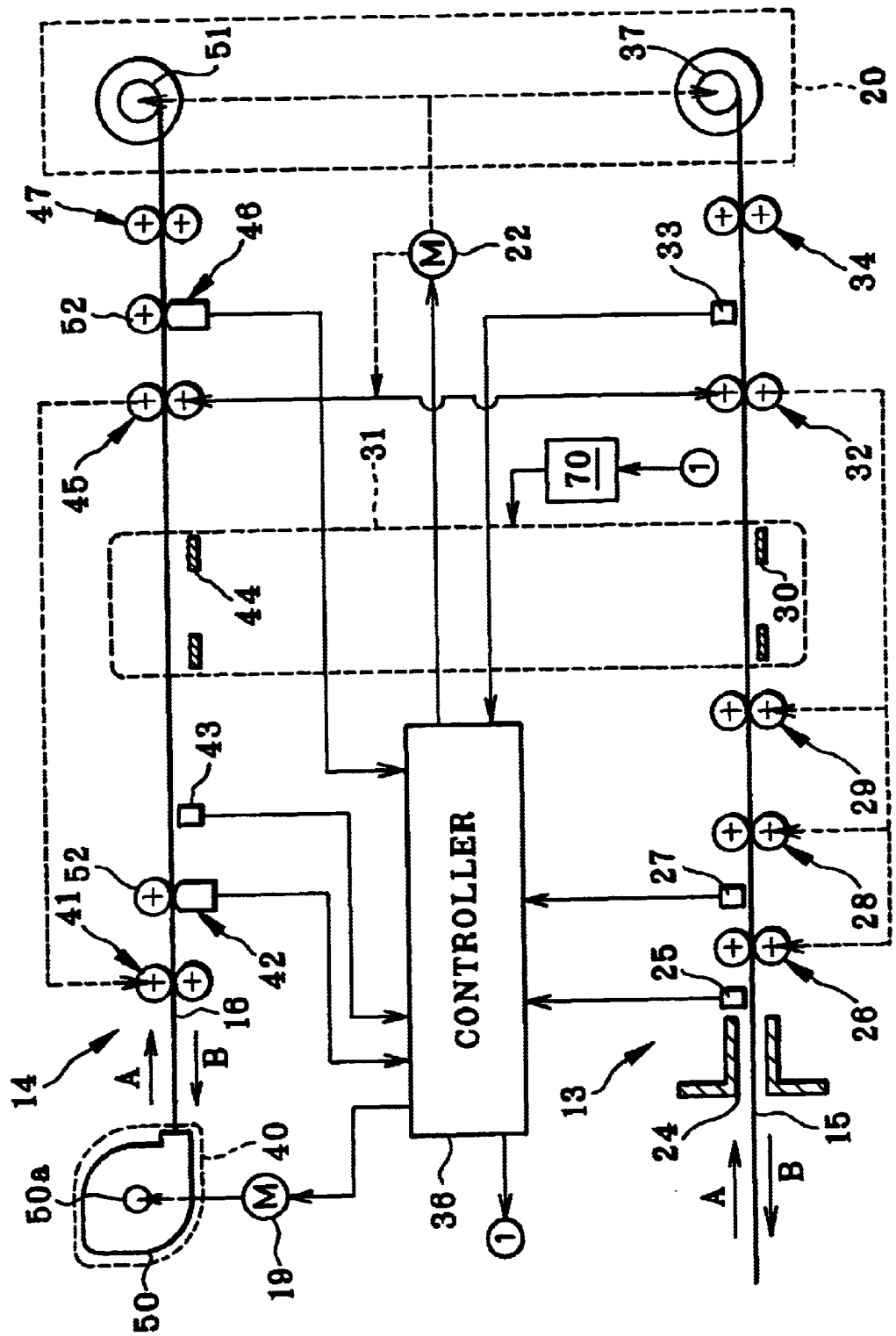
FIG. 3 is an explanatory view illustrating feeding paths in the photo film carrier.

In FIG. 3, the feeding path 13 for the photo film 15 of 135 type has an end sensor 25, a feed roller set 26, a perforation sensor 27, a feed roller set 28, a feed roller set 29, an exposure opening 30 at a light path, a photo film press mechanism 31, a feed roller set 32, a perforation sensor 33 and a feed roller set 34, as viewed in a sequence beginning at a photo film loader or passageway 24. Also, the photo film 15, moved forward from the feed roller set 34, is guided to the photo film winder unit 20.

The end sensor 25 detects insertion of a front end of the photo film 15. A controller 36 is supplied with a detection signal from the end sensor 25. According to the detection signal, the photo film advancing motor 22 is caused to rotate forwards. Rotations of the photo film advancing motor 22 are transmitted to the feed roller sets 26, 28, 29 and 32 by use of timing belts, pulleys, coupling rollers and other elements not shown. Therefore, the photo film 15 is fed toward the inside of the photo film carrier 10. Also, the photo film 15 being fed is guided into the photo film winder unit 20. The perforation sensors 27 and 33 detect perforations of the photo film 15. Detection signals from the perforation sensors 27 and 33 are used for designating positions of frames.

The exposure opening 30 is formed in the center of the feeding path 13, and introduces light from a light source to the photo film 15. The light transmitted by the photo film 15 is picked up by a CCD to read an image. The photo film press mechanism 31 is disposed to extend over the exposure opening 30, and squeezes the photo film 15 when an image frame is set at the exposure opening 30. A winder shaft 37 is disposed in the photo film winder unit 20. The winder shaft 37 is rotated by the photo film advancing motor 22 in synchronism with photo film feeding, and winds the photo film 15 for temporary reservation.

The feeding path 14 for the photo film 16 of the IX240 type has a cassette loader unit 40, a feed roller set 41, a magnetic reading head 42, a perforation sensor 43, an exposure opening 44, the photo film press mechanism 31, a feed roller set 45, a magnetic writing head 46, and a feed roller set 47 arranged in a sequence.

In FIG. 2, the cassette loader unit 40 is disposed in a rotatable manner in a left side of the base plate 11, and shiftable between a loading position and a guiding position. A grip projection 40a is secured to a top of the cassette loader unit 40, and when pulled up, allows setting of the cassette loader unit 40 in the loading position. In the loading position, a photo film cassette 50 is settable in the cassette loader unit 40. After setting the photo film cassette 50, the cassette loader unit 40 is moved back to the guiding position, so a passage mouth of the photo film cassette 50 is set at the feeding path 14.

The photo film 16 is advanced from the photo film cassette 50 in the guiding position by an advancing mechanism to an outside of the cassette shell. The photo film 15 is advanced by the advancing motor 19 and a spool drive shaft. The spool drive shaft is kept shiftable in an axial direction by a shifter mechanism (not shown). A spool 50a of the photo film cassette 50 is engaged with the spool drive shaft after the photo film cassette 50 is set in the guiding position.

The feed roller sets 41 and 45 are rotated by the photo film advancing motor 22. The photo film 16, fed through the feeding path 14, is guided to the photo film winder unit 20. A winder shaft 51 adapted for the IX240 type winds the photo film 16 having been advanced to the photo film winder unit 20. The winder shaft 51 is driven by the photo film advancing motor 22. When the photo film advancing motor 22 rotates forwards, the feed roller sets 41 and 45 rotate in a forward direction to feed the photo film 16 in the forward direction A to unwind the photo film 16 from the photo film cassette 50. When the photo film advancing motor 22 rotates backwards, the feed roller sets 41 and 45 rotate in a backward direction to feed the photo film 16 in the backward direction B to wind back the photo film 16 into the photo film cassette 50. The feed roller set 32 of the feeding path 13 is connected with the feed roller set 45 of the feeding path 14 in a manner of a single set of rollers. To drive the feed roller sets 32 and 45, rotations of the photo film advancing motor 22 are transmitted to those by belts, gears and other elements. Furthermore, rotations of the feed roller sets 32 and 45 are transmitted to the feed roller sets 26, 28, 29 and 41 by use of belts. The feed roller sets 34 and 47 are rotated in contact with the photo films 15 and 16 being moved, but are not driven directly. The winder shafts 37 and 51 are connected with one another in a manner of a single shaft, and rotated by transmission of rotation of the photo film advancing motor 22 with belts, gears, clutches and other elements not shown.

The magnetic reading head 42 is disposed for reading photograph-taking information recorded in a magnetic recording layer in the photo film 16. The magnetic writing head 46 is disposed for writing information to the layer newly. The perforation sensor 43 detects perforations formed in the photo film 16. The information from the magnetic reading head 42 and a detection signal from the perforation sensor 43 are sent to the controller 36, which sends information to the magnetic writing head 46 for the purpose of recording.

The exposure opening 44 is structurally the same as that in the feeding path 13 for 135 type, and has a size suitable for the photo film 16 of the IX240 type. When an image frame is set at the exposure opening 44, the photo film press mechanism 31 squeezes the photo film 16.

The single photo film press mechanism 31 is incorporated in the photo film carrier 10. In a manner irrespective of the feeding paths 13 and 14, the photo film press mechanism 31 is actuated to squeeze one of the photo films 15 and 16. In FIGS. 4A, 4B, 5A and 5B, the photo film press mechanism 31 includes lower masks 60 and 61, upper masks 62 and 63, a mask setting plate 64 and a plate shifter 65.

The lower masks 60 and 61 are disposed above respectively the exposure openings 30 and 44. The lower mask 60 is removable from the base plate 11. The lower mask 61 is fixedly retained to the base plate 11. Reading openings 60a and 61a are formed in the lower masks 60 and 61, have sizes of each image frame, and are adapted for reading images. The upper masks 62 and 63 are secured to a lower surface of the mask setting plate 64 in a removable manner, and opposed to the lower masks 60 and 61. The upper masks 62 and 63 are formed from transparent resin. When the photo films 15 and 16 are squeezed by the upper masks 62 and 63, then a CCD or other devices read information from the photo films 15 and 16 optically through the upper masks 62 and 63, the information including aspect information indicia, pseudo zoom information indicia and the like. The information being read is sent to the controller 36.

In FIG. 6, pivotal screws or a support pivot 66 is disposed in parallel with the width direction that is perpendicular to the photo film feeding direction, and keeps the mask setting plate 64 rotatable relative to the cover 12. The upper masks 62 and 63 are mounted on the mask setting plate 64 for the two types, or 135 type and IX240 type. A spring 67 biases the mask setting plate 64 toward the inside of the cover 12, so the mask setting plate 64 is located away from the feeding paths 13 and 14. To read the photo film 15, the plate shifter 65 drives the mask setting plate 64 to swing down against the spring 67 about the support pivot 66. Note that, in FIGS. 4A, 4B, 5A and 5B, the path upper walls 13b and 14b are intermediate plates, disposed under the mask setting plate 64, and fastened firmly to the cover 12 by screws, springs and the like not shown. The spring 67 is secured between the mask setting plate 64 and the path upper walls 13b and 14b.

The plate shifter 65 includes a solenoid 68 and an iron segment 69. The solenoid 68 is disposed on the base plate 11 and located between the path lower walls 13a and 14a. The iron segment 69 is secured to the mask setting plate 64, and opposed to a top side of the solenoid 68. The solenoid 68 includes a plunger 68a of iron and a winding (not shown) disposed about the plunger 68a. A solenoid driver 70 is controlled by the controller 36 to energize the winding in the solenoid 68, to create a magnetic field. The plunger 68a attracts the iron segment 69 to shift the mask setting plate 64. The upper masks 62 and 63 come close to respectively the lower masks 60 and 61, and retain the photo films 15 and 16 to set an image frame.

A cushioning pad 71 is secured to the inner surface of the cover 12 and opposed to a front end of the mask setting plate 64. The cushioning pad 71 is formed from rubber, sponge or polyurethane foam. When the mask setting plate 64 comes closer to the cover 12, the cushioning pad 71 prevents direct collision between the mask setting plate 64 and the cover 12.

The operation of the above construction is described now. Note that the reading of the IX240 type photo film is similar to that of 135 type photo film. To read the photo film 15, a photo film leading end is set at the photo film loader 24. The photo film advancing motor 22 rotates forwards, to rotate the feed roller sets 26, 28, 29, 32 and 34. Therefore, the photo film 15 is drawn into the photo film carrier 10, and fed in the forward direction A. When the perforation sensors 27 and 33 detect a perforation of the photo film 15, a scanner in the image reading device operates for prescanning.

In the prescanning, an image is read in a relatively low precision. According to data from the prescanning, conditions of reading an image are determined for fine scanning at a later stage. Upon completion of prescanning of all frames, the photo film advancing motor 22 is stopped to terminate the feeding of the photo film.

Then the photo film advancing motor 22 comes to rotate backwards. The photo film 15 is fed back by rotations of the feed roller sets 26, 28, 29, 32 and 34. In the backward feeding, each image frame of the photo film 15 is read by fine scanning.

In feeding the photo film 15, the mask setting plate 64 is kept by the spring 67 in an initial position away from the photo film 15. See FIGS. 4A and 5A. The photo film 15 on the exposure opening 30 is not squeezed by the lower mask 60 or 61 or the upper mask 62 or 63, and does not have scratches in the photo film surface. When the image is set in the reading position, the photo film press mechanism 31 causes the lower masks 60 and 61 and the upper masks 62 and 63 to squeeze the photo film 15, which is kept flat. A process of flattening of the photo film 15 is as follows.

Figure 4A:
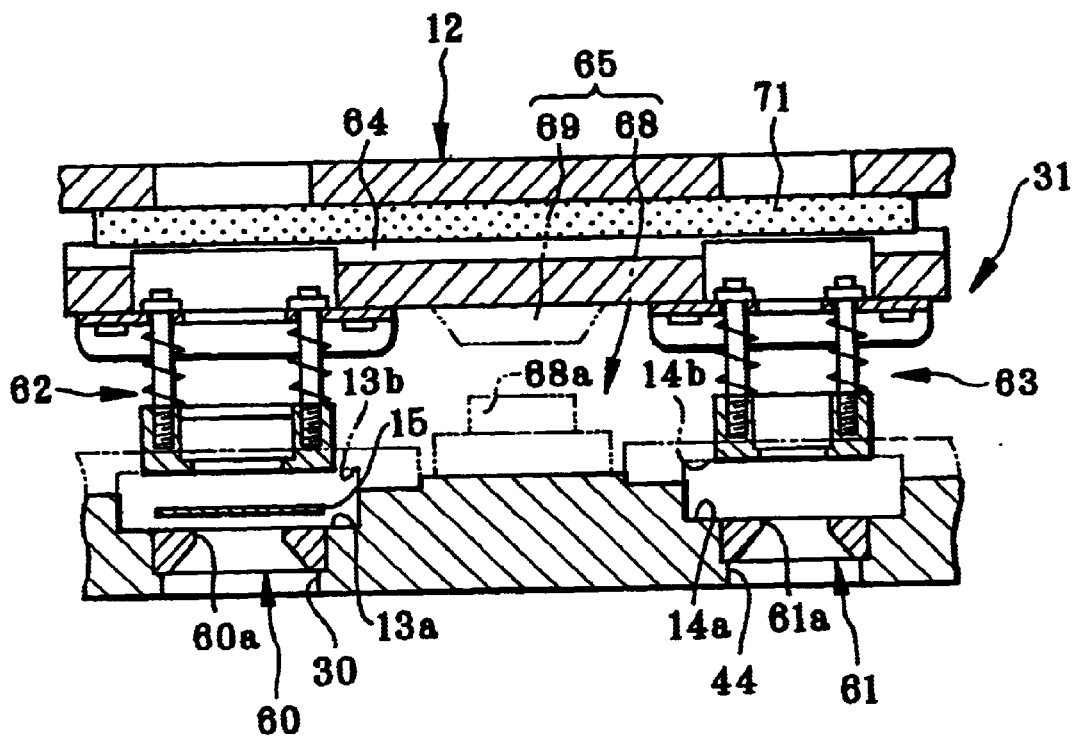
FIG. 4A is a cross section, partially broken, illustrating two mask units, a mask setting plate and a plate shifter in a state where the mask units are open.
Figure 4B:
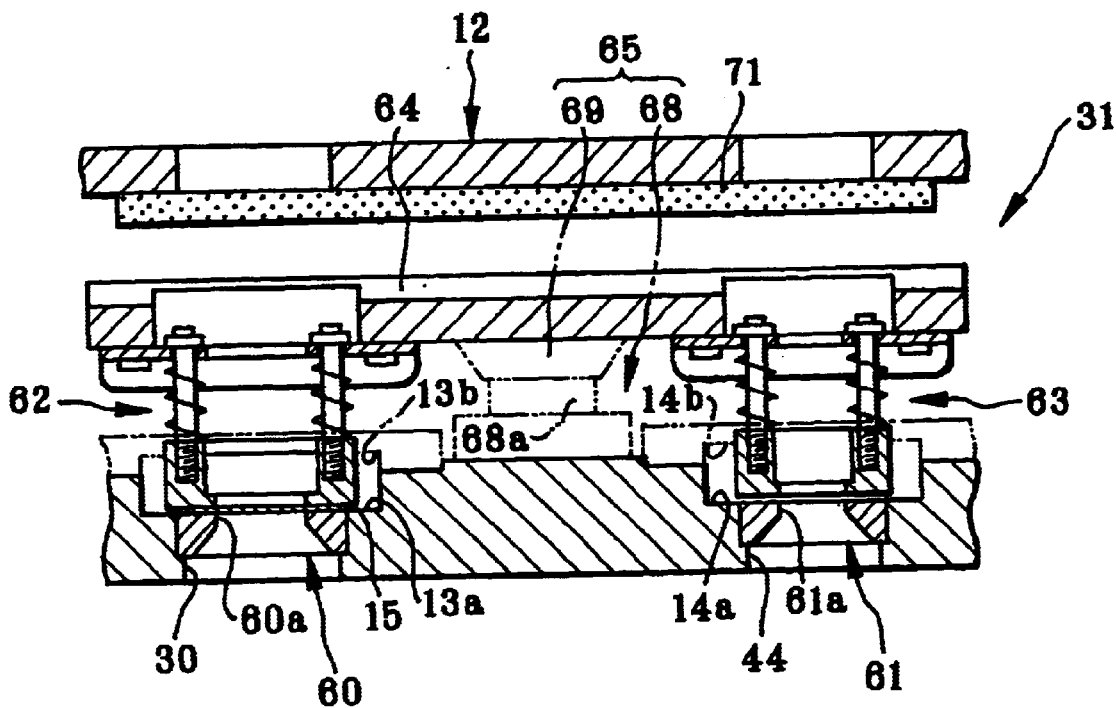
FIG. 4B is a cross section, partially broken, illustrating the same as FIG. 4A but in a state where the mask units are closed.
Figure 5A:
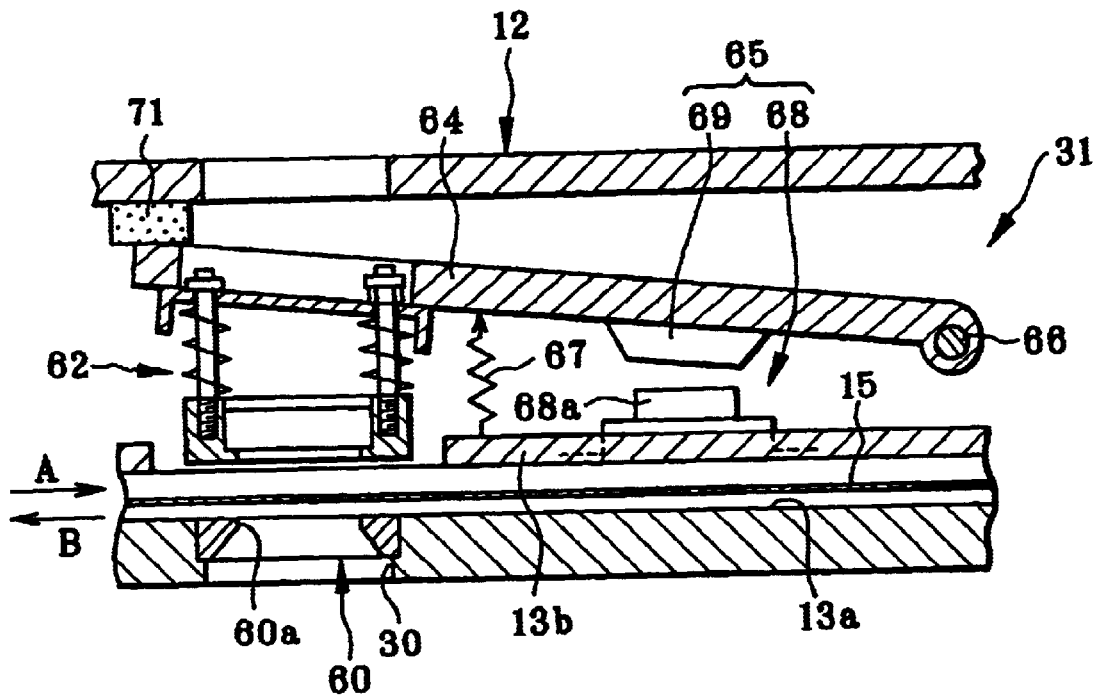
FIG. 5A is a vertical section, partially broken, illustrating one of the mask units and various elements in the state of FIG. 4A.
Figure 5B:
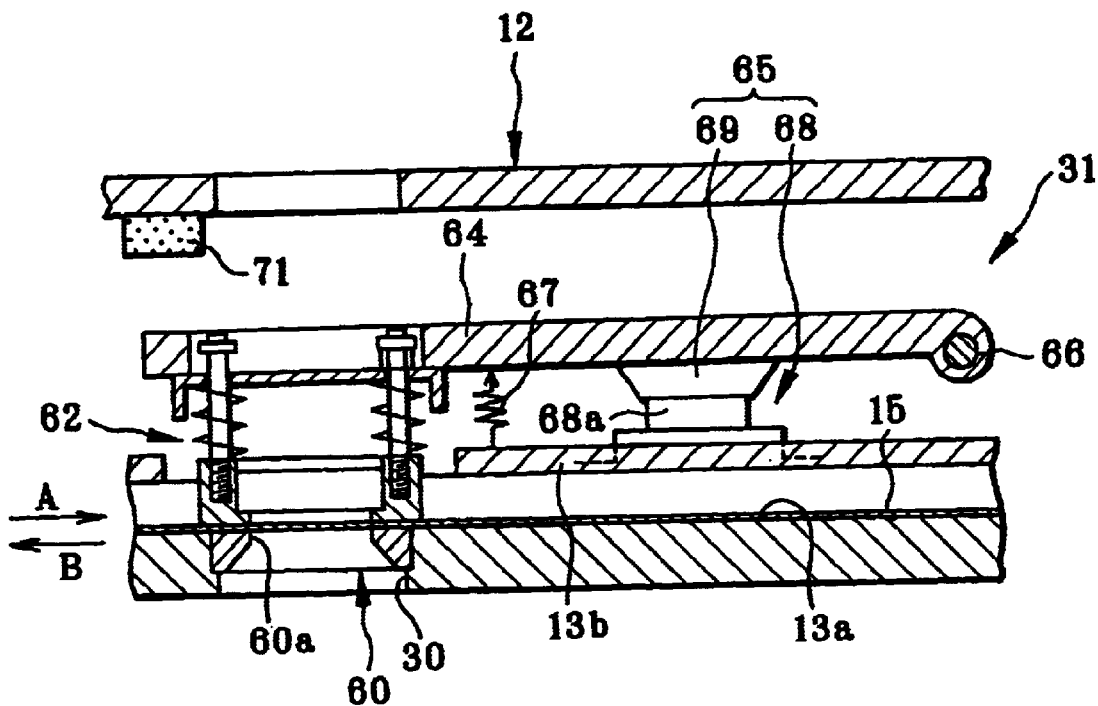
FIG. 5B is a vertical section, partially broken, illustrating the same as FIG. 4A but in the state of FIG. 4B.

The solenoid 68 is driven by the solenoid driver 70, and attracts the iron segment 69 to shift the mask setting plate 64. In FIGS. 4B and 5B, the mask setting plate 64 swings about the axis at the support pivot 66, so the upper mask 62 presses the photo film 15 on to the lower mask 60. The controller 36 reads an image while the photo film press mechanism 31 squeezes the photo film 15.

In the manner described above, the prescanning and fine scanning of images in the photo film 15 are effected by feeding of the feed roller sets 26, 28, 29, 32 and 34 and squeezing of the photo film press mechanism 31. When reading of all the images is completed, then the photo film advancing motor 22 is caused to rotate for a predetermined time, to eject the photo film 15 from the photo film carrier 10.

In the above embodiment, 135 type of the photo film 15 is read. Also, the IX240 type of the photo film 16 is read in the same operation. Elements for reading of the IX240 type are suitably structured, including the photo film feeding path, lower mask, upper mask, and winder unit.

When the photo film cassette 50 of the IX240 type is set in the photo film carrier 10, at first the photo film 16 is prescanned while wound back to the winder shaft 51. Then the photo film 16 is unwound and scanned finely. Each image is set at the exposure opening 44. The photo film is stopped, before the photo film press mechanism 31 causes the upper mask 63 to squeeze and hold the image at the lower mask 61. Consequently, the image in the photo film can be held reliably only by use of the photo film press mechanism 31 irrespective of the feeding paths 13 and 14. The plate shifter 65 for driving the mask setting plate 64 is disposed between the feeding paths 13 and 14. This is advantageous in economizing a space inside the photo film carrier 10, and is not inconsistent to miniaturizing the photo film carrier 10.

In the above embodiment, the mask setting plate 64 is secured to the cover 12. However, the mask setting plate 64 may be directly connected to the base plate 11. The mask setting plate 64 can be secured to the base plate 11 by use of a pivot in a rotatable manner. Such a pivot can have a shape extending perpendicularly to the feeding of the photo film. This is effective in that the plural upper masks can be pressed by the single movable plate for pressing.

In the above embodiment, the photo film press mechanism 31 is driven by use of the solenoid 68. However, the photo film can be pressed by the plate shifter 65 which may include a motor or other types of actuator. Cams or suitable mechanical elements may be used in combination with the motor or the like. Also, the plate shifter 65 can include a suction mechanism.

In the above embodiment, the photo film carrier is set in the image reading device. However, a photo film carrier may be types for other purposes. For example, a photographic printer of an analog printing type may have the photo film carrier of the invention, and can include a printing lens for focusing light to color photographic paper after the transmission of the light through the photo film.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film carrier for access to an image frame in photo film for printing or reading, said photo film carrier comprising:

a carrier body;

at least one feeding path, formed in said carrier body, having a lower guide member and an upper guide member, for passing said photo film;

at least one mask unit, including a lower mask and an upper mask disposed in respectively said lower and upper guide members in said carrier body, for insertion of said photo film therebetween, said mask unit being adapted for setting said image frame;

a mask setting member, pivotally movable in said carrier body between first and second positions, for setting said upper mask proximate to said lower mask when in said first position, and for setting said upper mask apart from said lower mask when in said second position, such that said upper mask is closer to said lower mask in said first position than in said second position; and a support mechanism in said carrier body for keeping said mask setting member movable pivotally about a rotational axis that extends crosswise to said feeding path.

2. A photo film carrier as defined in claim 1, wherein each of said lower and upper masks comprises a transparent mask plate or a mask plate having an opening, for constituting a light path to pass light.

3. A photo film carrier as defined in claim 2, wherein said carrier body includes:

a base member, including said lower guide member, and having said lower mask secured thereto; and a cover, including said upper guide member, having said mask setting member secured thereto in a pivotally movable manner, for constituting said support mechanism, to cover said base member.

4. A photo film carrier as defined in claim 3, further comprising:

a loader unit, disposed at a first end of said feeding path, for being loaded with said photo film;

a winder unit, disposed at a second end of said feeding path, for winding said photo film from said loader unit;

wherein said rotational axis of said support mechanism is disposed close to said winder unit, and when said mask setting member is in said second position, an edge thereof close to said loader unit is disposed higher than when said mask setting member is in said first position.

5. A photo film carrier as defined in claim 4, wherein at least one feeding path comprises plural feeding paths, said at least one mask unit comprises plural mask units, and said mask setting member is single, extends crosswise to said plural feeding paths, and supports said upper mask of any of said plural mask units.

6. A photo film carrier as defined in claim 5, further comprising a shifter for shifting said mask setting member between said first and second positions.

7. A photo film carrier as defined in claim 6, further comprising a hinge mechanism for keeping said cover pivotally movable on said base member about a rotational axis that extends substantially in parallel with said feeding path.

8. A photo film carrier as defined in claim 7, wherein said cover includes:

a cover body; and first and second intermediate plates, oriented substantially in parallel with said cover body, disposed under said cover body in a stationary manner, for constituting said upper guide member, and for defining a passage gap therebetween, said passage gap containing said upper mask movably;

said mask setting member is contained in a pivotally movable manner in a space defined between said cover body and said first and second intermediate plates.

9. A photo film carrier as defined in claim 8, wherein said shifter includes a solenoid disposed between said plural feeding paths.

10. A photo film carrier as defined in claim 9, wherein said shifter further includes a bias mechanism for biasing said mask setting member toward said second position;

said solenoid shifts said mask setting member toward said first position.

11. A photo film carrier as defined in claim 10, wherein said upper mask further includes:

plural pins for keeping plural corner portions of said mask plate slidable relative to said mask setting member; and at least one compression spring for biasing said mask plate in a direction away from said mask setting member, to press said mask plate toward said lower mask by being compressed when said mask setting member is in said first position, so as to tighten a contact between said mask plate and said photo film.

12. A photo film carrier as defined in claim 10, wherein said plural mask units include first and second mask units, said lower mask of said first mask unit is removably secured to said base member, and said lower mask of said second mask unit is fixedly secured to said base member.

13. The photo film carrier as defined in claim 1, wherein said upper mask is removably secured to a lower surface of the mask setting member.

14. A photo film carrier comprising:

a carrier body;

at least one feeding path, formed in said carrier body, having a lower guide member and an upper guide member, for passing a photo film;

at least one mask unit, including a lower mask and an upper mask disposed in respectively said lower and upper guide members in said carrier body, for insertion of said photo film therebetween, said mask unit being adapted for setting an image frame of said photo film;

a mask setting member, which squeezes said photo film between said upper mask and said lower mask to read said image frame, such that said upper and lower guide members are opposed to each other.

15. A photo film carrier comprising:

a carrier body;

at least one feeding path, formed in said carrier body, having a lower guide member and an upper guide member, for passing a photo film;

at least one mask unit, including a lower mask and an upper mask disposed in respectively said lower and upper guide members in said carrier body, for insertion of said photo film therebetween, said mask unit being adapted for setting an image frame of said photo film;

a mask setting member, pivotally movable in said carrier body between first and second positions, for setting said upper mask proximate to said lower mask when in said first position, such that said photo film is retained by said upper and lower mask to set said image frame, and for setting said upper mask apart from said lower mask when in said second position, such that said upper mask is closer to said lower mask in said first position than in said second position.

* * * * *